(12) United States Patent
Van Der Borght et al.

(10) Patent No.: US 8,830,641 B2
(45) Date of Patent: Sep. 9, 2014

(54) ELECTROSTATIC DISCHARGE PROTECTION FOR HIGH VOLTAGE DOMAINS

(71) Applicant: Sofics BVBA, Gistel (BE)

(72) Inventors: Johan Van Der Borght, Gistel (BE); Sven Van Wijmeersch, Gistel (BE); Benjamin Van Camp, Gistel (BE); Bart Sorgeloos, Gistel (BE)

(73) Assignee: Sofics BVBA, Gistel (BE)

( * ) Notice: Subject to any disclaimer, the term of this patent is extended or adjusted under 35 U.S.C. 154(b) by 0 days.

(21) Appl. No.: 13/784,250

(22) Filed: Mar. 4, 2013

(65) Prior Publication Data

US 2013/0229736 A1    Sep. 5, 2013

Related U.S. Application Data

(60) Provisional application No. 61/606,100, filed on Mar. 2, 2012.

(51) Int. Cl.
*H02H 9/00* (2006.01)
*H01C 7/12* (2006.01)
*H02H 1/00* (2006.01)
*H02H 1/04* (2006.01)
*H02H 3/22* (2006.01)
*H02H 9/06* (2006.01)

(52) U.S. Cl.
USPC ............................................ 361/56; 361/118

(58) Field of Classification Search
CPC .................................................. H01L 27/0248
USPC ........................................................ 361/56, 118
See application file for complete search history.

(56) References Cited

U.S. PATENT DOCUMENTS

| | | | |
|---|---|---|---|
| 7,782,580 B2 * | 8/2010 | Gauthier | ......................... 361/56 |
| 2009/0086391 A1 | 4/2009 | Gauthier, Jr. et al. | |
| 2014/0063665 A1 * | 3/2014 | Chen et al. | ...................... 361/56 |

* cited by examiner

*Primary Examiner* — Dharti Patel
(74) *Attorney, Agent, or Firm* — Volpe and Koenig, P.C.

(57) ABSTRACT

An electrostatic discharge (ESD) protection device is disclosed. The ESD protection circuit is configured to operate in high voltage domains. The ESD protection device may further include stacked NMOS or PMOS devices. The gates of the MOS devices may be driven by respective inverters. The inverters may be coupled to a voltage divider and may be triggered by respective trigger circuits. Power nodes of the inverters may be connected such that devices in the ESD protection circuit are exposed to voltages that are within their maximum voltage rating.

23 Claims, 14 Drawing Sheets

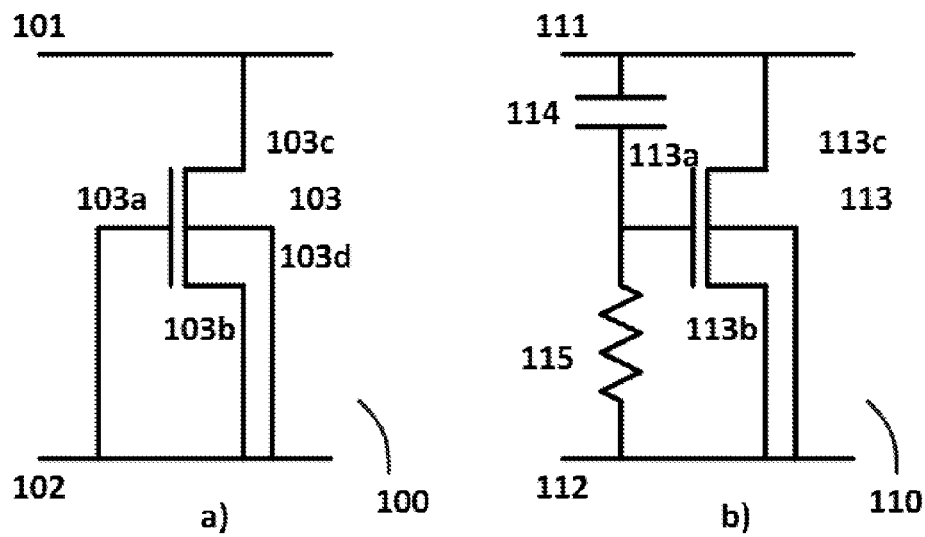
FIG. 1 - PRIOR ART
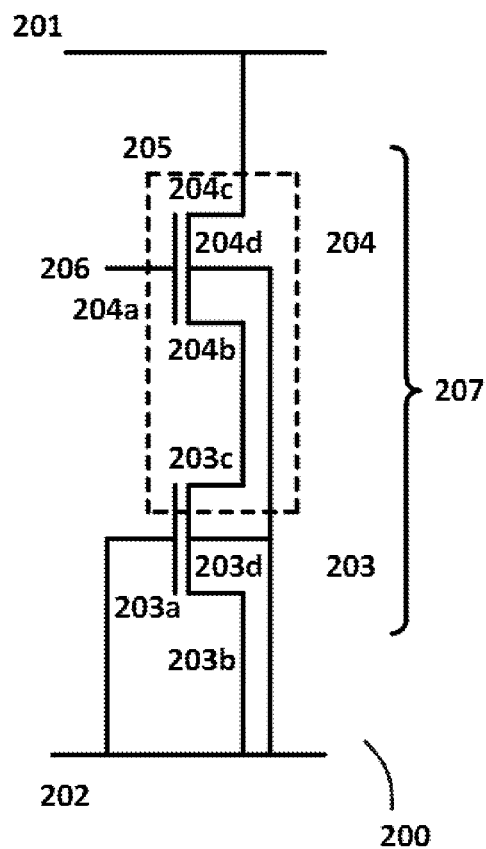
FIG. 2 - PRIOR ART

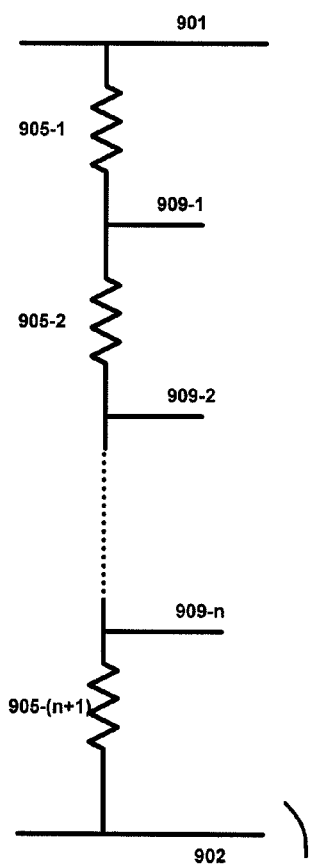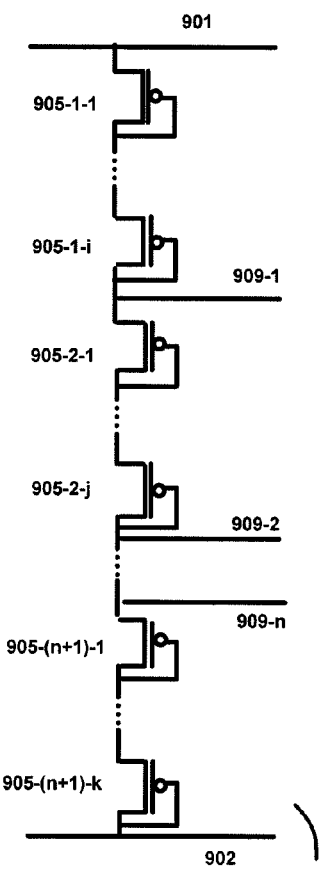
FIG. 9a  905
FIG. 9b  905

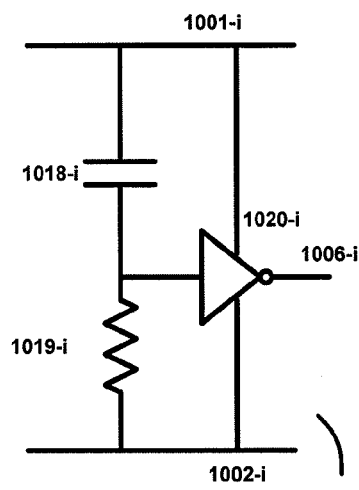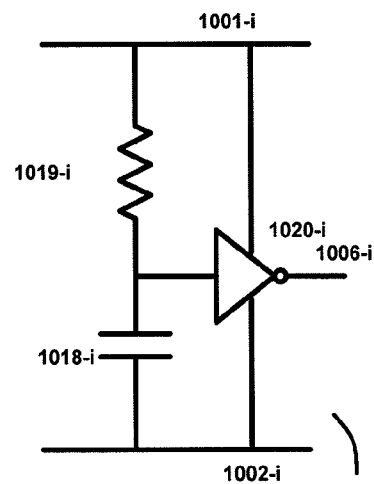
FIG. 10j    1004-i         FIG. 10k    1004-i

ELECTROSTATIC DISCHARGE PROTECTION FOR HIGH VOLTAGE DOMAINS

CROSS REFERENCE TO RELATED APPLICATIONS

This application claims the benefit of U.S. provisional application No. 61/606,100 filed Mar. 2, 2012, the contents of which are hereby incorporated by reference herein.

FIELD OF THE DISCLOSURE

The disclosure generally relates to Electrostatic Discharge (ESD) protection, Latch-up (LU) prevention, and prevention of damage during Electrical Overstress (EOS) conditions. More specifically, the disclosure relates to a method of protecting an Integrated Circuit (IC) against ESD damages, while maintaining high levels of robustness against LU and EOS protection.

BACKGROUND

The size of process nodes continues to shrink. As a result, the related voltages which can be used to power devices in these nodes are lowered. In order to be backward compatible with legacy chips from previous generations and older standards, input/output (I/O) devices may be required that swing above the maximum ratings for the process used to create the devices.

While this may be easily achieved for input devices powered by a lower voltage, it may not be easy for output drivers, since the output drivers may require a higher voltage supply to source the necessary output current. This higher voltage supply may not be needed for input devices. Since the voltage of this higher voltage supply may be higher than the allowed maximum rating of the output devices, long-term reliability of the output devices may only be achieved by design and control of all voltages over the different transistors and devices.

However, this also means that ESD protection needs to allow for voltages across nodes of the devices used in the ESD protection that surpass the maximum rating of the devices defined by the process. When the voltage of the voltage supply exceeds the maximum rating of the devices powered by the supply, the need for a new type of ESD clamp arises.

The problem of long-term reliability when using a single stage MOS device may be overcome by stacking the MOS transistors and thus dividing the 'overvoltage' to levels within the maximum ratings. Traditional stacked MOS devices and various ways to drive these to maximize their current driving capabilities are widely known. However, in most cases, the stacked MOS devices may share the same bulk for bipolar action, thus exposing at least one drain junction to an 'overvoltage'. Hence stacking more than 2 MOS devices may not be possible.

FIG. 1a depicts a schematic of a traditional ESD clamp 100. An NMOS 103 may have its gate 103a connected to the source 103b, turning it off. As understood by one skilled in the art, the gate of a grounded gate NMOS (ggNMOS) may be coupled to its source which may turn off the channel of the NMOS. Because its channel is off, a rather high voltage may be needed to turn on the parasitic NPN between drain 103c and source 103b (and bulk 103d). In another traditional ESD clamp 110, as depicted in FIG. 1b, the NMOS 110 may be RC-triggered. By means of a resistor 115, the gate node 113a may be pulled to its source 113b during normal operation.

When an ESD event occurs, the transient voltage at the anode 111 may be transferred to the gate 113a through the capacitor 114 if the capacitor value is correctly chosen, and the biased gate may turn on the channel, thus allowing for triggering at a lower voltage than the clamp 100.

FIG. 2 depicts an example of a commonly known overvoltage-tolerant circuit often used in drivers. The stack 207 of 2 or more MOS transistors 203 and 204 may allow for voltages above nominal on the anode 201 without failure, while at the same time the stacked arrangement may deliver the protection as described above with a single MOS transistor. Besides the two parasitic NPNs in the two MOS devices 203 and 204 formed between their respective drains and sources (and bulk), a third parasitic may exist between the drain 204c of the upper MOS 204 and the source of the lower MOS 203b. This may act as a single bipolar, similar to the parasitic bipolar formed by configuration shown in FIGS. 1a and 1b, in parallel with the stack of the 2 parasitic bipolar transistors. In order to avoid overstress of the individual transistors 203 and 204, the gate 204a of the transistor 204 may be tied to a positive supply voltage 206. The drain 204c may be directly connected with the anode 201. MOS 203 may be used as an output driver wherein the gate 203a of MOS 203 may be used for signaling and to control the overall behavior of the stack. For the circuit depicted in FIG. 2, the gate 203a may also be grounded to increase the trigger voltage of circuit 200. The source 203b may be directly connected with the ground line. In general, transistors 203 and 204 may share a common substrate node through the substrate connection 203d and 204d to allow for single bipolar turn-on mode and a sufficient low holding voltage. To protect the upper drain-bulk junction 204c-204d or source-bulk junction 204b-204d or lower drain-bulk junction 203c-203d, any local silicidation (fully or partially, if any) may be blocked corresponding to the portions outlined by dotted line 205 to prevent any intra- or inter-finger trigger issues.

Circuit 200 may be appropriate for use as an overvoltage-tolerant circuit where the voltage at the IO pin can be larger than the voltage at VDD for small periods. However, it may not be a reliable solution when applied to an 'overvoltage' power domain, wherein the voltage of the power domain is permanently higher than the maximum voltage rating for a single transistor.

SUMMARY

An embodiment is disclosed of a circuit for use in an electrostatic discharge (ESD) protection device. The circuit includes a first NMOS device including a first gate, a first source, and a first drain. The circuit further includes a second NMOS device including a second gate, a second source, and a second drain, wherein the first source is coupled to the second drain. The circuit further includes a first inverter including a first higher voltage power node, a first lower voltage power node, a first input, and a first output, wherein the first output is coupled to the first gate. The circuit further includes a second inverter including a second higher voltage power node, a second lower voltage power node, a second input, and a second output, wherein the second output is coupled to the second gate and wherein the second higher voltage power node is coupled to the first output. The circuit further includes a voltage divider coupled to the first lower voltage power node and a trigger circuit coupled to the first input and the second input, wherein the trigger circuit is configured to sense an ESD event.

In one embodiment of the circuit, the voltage divider includes at least a first voltage-limiting resistor serially connected to a second voltage-limiting resistor to form a biasing node between the first voltage-limiting resistor and the second voltage-limiting resistor, and wherein the first lower voltage power node is coupled to the biasing node.

In one embodiment of the circuit, the trigger circuit includes at least a first trigger resistor serially connected to a first trigger capacitor, and wherein the first trigger resistor is coupled to the first input, and further wherein the first trigger capacitor is coupled between the first input and the first lower voltage power node.

In one embodiment of the circuit, the trigger circuit includes a third inverter including a third input and a third output, wherein the third output is coupled to the first input, at least a first trigger capacitor, wherein the first trigger capacitor is coupled to the third input, and at least a first trigger resistor serially connected to the first trigger capacitor, wherein the first trigger resistor is coupled between the third input and the first lower voltage power node.

In another embodiment, a circuit for use in an electrostatic discharge (ESD) protection device includes a first PMOS device including a first gate, a first source, and a first drain. The circuit further includes a second PMOS device including a second gate, a second source, and a second drain, wherein the first source is coupled to the second drain. The circuit further includes a first inverter including a first higher voltage power node, a first lower voltage power node, a first input, and a first output, wherein the first output is coupled to the first gate. The circuit further includes a second inverter including a second higher voltage power node, a second lower voltage power node, a second input, and a second output, wherein the second output is coupled to the second gate and wherein the second lower voltage power node is coupled to the first output. The circuit further includes a voltage divider coupled to the first higher voltage power node and a trigger circuit coupled to the first input and the second input, wherein the trigger circuit is configured to sense an ESD event.

In one embodiment of the circuit, the voltage divider includes at least a first voltage-limiting resistor serially connected to a second voltage-limiting resistor to form a biasing node between the first voltage-limiting resistor and the second voltage-limiting resistor, and wherein the first higher voltage power node is coupled to the biasing node.

In one embodiment of the circuit, the trigger circuit includes at least a first trigger resistor serially connected to a first trigger capacitor, and wherein the first trigger capacitor is coupled to the first input, and further wherein the first trigger resistor is coupled between the first input and the first higher voltage power node.

In one embodiment of the circuit, the trigger circuit includes a third inverter including a third input and a third output, wherein the third output is coupled to the first input, at least a first trigger resistor, wherein the first trigger resistor is coupled to the third input, and at least a first trigger capacitor serially connected to the first trigger resistor, wherein the first trigger capacitor is coupled between the third input and the first higher voltage power node.

BRIEF DESCRIPTION OF THE DRAWINGS

A more detailed understanding may be had from the following description, given by way of example in conjunction with the accompanying drawings wherein:

FIG. 1a is a schematic diagram of conventional grounded gate N-type metal oxide semiconductor (ggNMOS) transistor.

FIG. 1b is a schematic diagram of conventional NMOS transistor with RC-triggering.

FIG. 2 is a schematic diagram of a conventional stacked MOS circuit.

FIGS. 9a-9d are schematic diagrams of implementations of a voltage divider circuit that may be used in any embodiment of an ESD protection device.

FIGS. 10a-10k are schematic diagrams of implementations of a trigger circuit that may be used in any embodiment of an ESD protection device.

DETAILED DESCRIPTION

Figure 3:
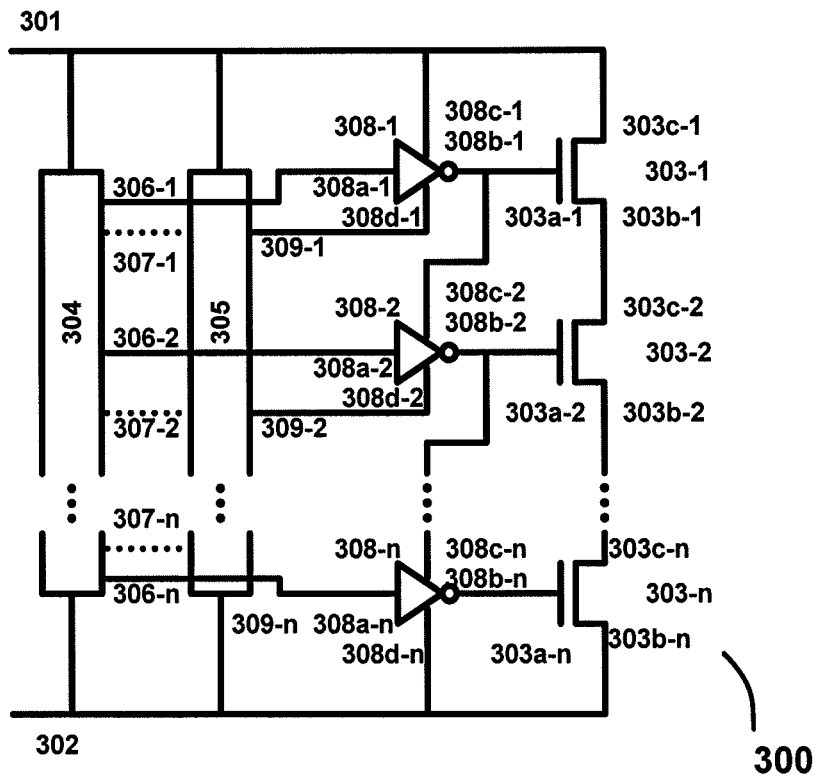
FIG. 3 is a schematic diagram of a first embodiment of an ESD protection device.

In the following descriptions, common numerical designations may be used for similar, corresponding parts across multiple figures. In general, the part number will start with the figure number. For instance, NMOS transistor 303-1 as shown in FIG. 3 corresponds to similar NMOS transistor 603-1 shown in FIGS. 6a and 6b. Likewise, trigger circuit 304 shown in FIG. 3 corresponds to similar trigger circuit 404 shown in FIG. 4 and trigger circuit 1004 shown in FIG. 10.

One of ordinary skill in the art should recognize a node, device, circuit, or region may be viewed as serving multiple functions. Furthermore, a node, device, circuit, or region may be referred to by different descriptions. For instance, node 301 and node 302 of FIG. 3 may also be referred to as anode 301 and cathode 302, respectively. As another example, an ESD protection device may be interchangeably referred to as a clamp or ESD clamp. The numerical designation will provide an unambiguous notation for the node, device, circuit, or region under consideration while the preceding descriptor should aid the readability of the description in the context of the discussion.

An MOS stack of an ESD protection device may achieve boosted driving by using the disclosed configurations of stacked driving circuitry. The disclosed stacking techniques may improve long-term reliability by limiting DC voltages across the transistors to remain within the transistors' maximum ratings.

A maximum voltage may be the highest voltage difference that may be placed over a device so that the reliability over the lifetime of the product is ensured. When describing voltages, a maximum rating may be synonymous with a maximum voltage or maximum voltage rating.

Inverting drivers may be transistors used in an inverter. An inverter may output a logic low voltage when a logic high voltage is placed at the input. An inverter may output a logic high voltage when a logic low voltage is placed at the input. The inverting drivers may be a standard inverter configuration comprising a NMOS and PMOS, with both gates coupled together and both drains coupled together, or may be alternative inverter configurations like NMOS-logic, PMOS-logic, resistor-transistor logic (RTL), etc.

A trigger circuit may detect if an ESD or overstress condition is present. If present, a signal may be delivered by the trigger circuit to a clamp to turn on the clamp. If no overstress condition or ESD is present, a signal may be delivered to turn off the clamp or to keep the clamp off.

A voltage power node may be a node that may be used to provide power. The provided voltage may be a high or low voltage.

An exemplary embodiment of an ESD protection device 300 is depicted in FIG. 3. The main portion of an ESD current may flow through a stack of MOS transistors 303-1 through 303-$n$. The MOS transistors 303 are stacked such that, for instance, a source 303$b$-1 of a first MOS transistor 303-1 is serially coupled to a drain 303$c$-2 of a second MOS transistor 303-2. The number of MOS transistors, n, may depend on the maximum rating of the transistor 303 and on the desired voltage placed between anode 301 and cathode 302. In FIG. 3, n transistors are shown labeled 303-1, 303-2, . . . 303-$n$, respectively. n can be any integer larger than or equal to 2. Though FIG. 3 depicts three transistors 303, there may any number of MOS transistors 303 that is greater than or equal to 2. Each transistor 303 has at least a gate 303$a$, a source 303$b$ and a drain 303$c$. For instance, transistor 303-1 comprises a gate 303$a$-1, a source 303$b$-1, and a drain 303$c$-1. Note that the bulk of transistor 303 is not shown. The bulk can be connected to any node within the scope of the invention. In one exemplary embodiment, the bulk may be connected to the cathode 302, which may or may not be the substrate. Alternatively, the bulk of each transistor may be connected to the source 303$b$ of each transistor separately and respectively.

The ESD protection device 300 may further comprise a voltage divider circuit 305 coupled between the anode 301 and the cathode 302. The ESD protection device 300 may further comprise at least one inverting circuit 308. In FIG. 3, n inverting circuits 308 are shown, labeled 308-1, 308-2, . . . 308-$n$, respectively. Each inverting circuit 308 may have at least 4 connections: an input 308$a$, an output 308$b$, a higher voltage power node 308$c$, and a lower voltage power node 308$d$. For instance, inverting circuit 308-1 comprises an input 308$a$-1, an output 308$b$-1, a higher voltage power node 308$c$-1, and a lower voltage power node 308$d$-1. The output 308$b$ may be coupled to gate 303$a$ of the corresponding transistor 303. For example, if n transistors 303 are used, 308$b$-1 may be coupled to 303$a$-1 and 308$b$-2 may be coupled to 303$a$-2, and up to the coupling of 308$b$-$n$ to the gate 303$a$-$n$. The higher voltage power node 308$c$-1 may be coupled to the anode 301. The higher voltage power node 308$c$-$x$ may be coupled to the gate 303$a$-($x$−1), where x is any number between 2 and n. For example, the voltage power node 308$c$-1 may be coupled to anode 301, the voltage power node 308$c$-2 may be coupled to gate 303$a$-1, and up to the coupling of the voltage power node 308$c$-$n$ to the gate 303$a$-($n$−1). Further note higher voltage power node 308$c$-$x$ may also be coupled to output 308$b$-($x$−1).

The inverters 308 as shown, for example, in FIG. 3 and as further described throughout the disclosed embodiments, may be formed by an NMOS/PMOS transistor stacked pair. The NMOS and PMOS transistors may have both gates coupled together and both drains coupled together, or may be alternative inverter configurations like NMOS-logic, PMOS-logic, resistor-transistor logic (RTL), etc. The gates of the NMOS/PMOS transistors may be coupled to the input 308$a$. The drains of the NMOS/PMOS transistors may be coupled to the output 308$b$. The source of the PMOS transistor may be coupled to the higher voltage power node 308$c$. The source of the NMOS transistor may be coupled to the lower voltage power node 308$d$.

The ESD protection device 300 may further include a trigger circuit 304 having at least n trigger taps, 306-1 through 306-$n$, each coupled to the respective one of the inputs 308$a$-1 through 308$a$-$n$ of the inverting circuit 308. For example, trigger tap 306-1 may be coupled to input 308$a$-1, trigger tap 306-2 may be coupled to input 308$a$-2, and up to the coupling of trigger tap 306-$n$ to input 308$a$-$n$. The ESD protection device 300 may further comprise at least one voltage divider circuit 305 coupled between the anode 301 and the cathode 302. The voltage divider circuit 305 may have at least n voltage divider taps, 309-1 through 309-$n$, each coupled to the respective one of the lower voltage power nodes 308$d$-1 through 308$d$-$n$. For example, voltage divider tap 309-1 may be coupled to lower voltage power node 308$d$-1, voltage divider tap 309-2 may be coupled to lower voltage power node 308$d$-2, and up to the coupling of voltage divider tap 309-$n$ to lower voltage power node 308$d$-$n$. It may also be possible to provide a coupling between trigger circuit 304 and voltage divider circuit 305 by means of the coupling 307. In FIG. 3, n couplings, 307-1 through 307-$n$, are shown, but any number of couplings could be implemented. Note also that though FIG. 3 depicts the voltage divider circuit 305 with n biasing voltages, 309-1 through 309-$n$, voltage divider circuit 305 may provide a different number of biasing voltages than n (the number of transistors 303).

During normal operation, the trigger circuit 304 may be configured to set each inverting driver 308 in a low output state. When an inverting driver 308-$x$ is in a low output state, the output of the inverter 308$b$-$x$ may have a voltage level equal to or close to the voltage at the respective lower voltage power node 308$d$-$x$. The higher voltage power node 308$c$-$x$ of inverting driver 308-$x$ may be coupled to the output 308$b$-($x$−1) of the inverting driver 308-($x$−1). The lower voltage power node 308$d$-($x$−1) of inverter 308-($x$−1) may be coupled to biasing voltage 309-($x$−1) from the voltage divider circuit 305, wherein x may be any number from 2 to n. Hence, the inverting driver 308-$x$ may receive a voltage level on its higher voltage power node 308$c$-$x$ equal to or close to the biasing voltage of the voltage divider tap 309-($x$−1), and may receive the biasing voltage of the voltage divider tap 309-$x$ at its lower voltage power node 308$d$-$x$. The higher voltage power node 308$c$-1 of the first inverting driver 308-1 may be coupled to and may be provided power by the anode 301. The lower voltage power node 308$d$-$n$ of the n-th inverting driver 308-$n$ may be coupled to the cathode 302. All gates 303$a$-$x$ may receive a voltage equal or close to respective biasing voltage 309-$x$. The voltages at the sources 303$b$-$x$ may only maximally differ from the voltages at the gates 303$a$-$x$ by the MOS threshold voltage Vth, unless the source is driven and/or biased to a defined voltage. Hence, all transistors may be biased within normal operating voltages and may be below the maximum voltage ratings of the transistors, since the voltage divider 305 may divide the overvoltage between anode 301 and cathode 302 in voltages within the maximum rating.

During a stress event between the anode 301 and the cathode 302, the trigger circuit 304 may send signals 306 to the input 308$a$ of the inverting drivers 308. This may cause the drivers to switch to a high output state. In a high output state, the voltage of the output 308$b$-$x$ of the inverter 308-$x$ may be equal to or close to the voltage at the higher voltage power node 308$c$-$x$ of the inverter 308-$x$, and may cause the shunting transistors 303-$x$ to turn on.

By using inverters 308 instead of coupling the shunting transistors 303 directly to the trigger circuit 304, the speed of the overall ESD clamping system may increase. Also, resistance of the MOS stack in conducting state seen between the anode 301 and the cathode 302 may decrease because transistors 303 may now be biased to the highest voltage allowed by the maximum rating.

Although only three shunting devices and inverting drivers are shown in FIG. 3, one skilled in the art should recognize that the number of stacked devices can vary and can be as few as two devices or more than three devices. Also, one should recognize that the topology of each inverting circuit 308 may be different. For example, the circuitry comprising inverting circuit 308-1 may not be the same as the circuitry comprising inverting circuit 308-2. Also the layout, type, and size of each transistor 303 may be different.

Although only one inverting driver 308-x is shown coupled between trigger tap 306-x and gate 303a-x, one skilled in the art should recognize that any number of inverting drivers can be placed in sequence. In this way, any odd number of inverters may be placed in sequence to produce an overall inverting output, or any even number of inverters may be placed in sequence to produce a non-inverting output.

The ESD protection device is not limited to NMOS shunting transistors 303. Instead PMOS transistors 403 may be used (see FIG. 4) or any combination of NMOS and PMOS transistors 503 (see FIGS. 5a-5c) may be used.

Figure 4:
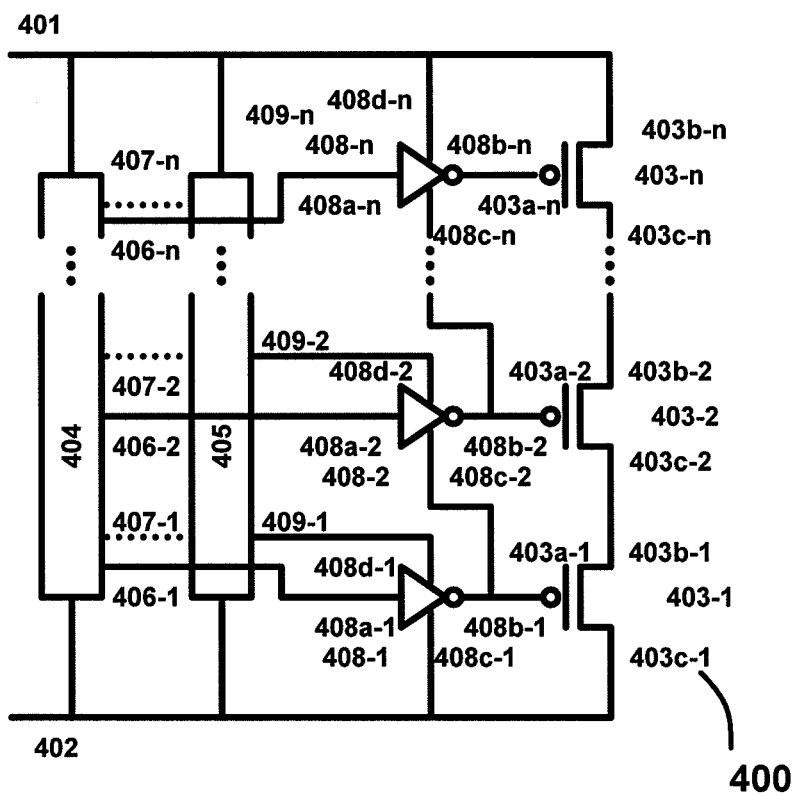
FIG. 4 is a schematic diagram of another embodiment of an ESD protection device.

FIG. 4 shows an embodiment of an ESD protection device with all PMOS transistors implementing the MOS stack of transistors 403-1 through 403-n. The main portion of an ESD current may flow through the stack of MOS transistors 403. The number of MOS transistors may depend on the maximum rating of the transistor 403 and on the desired voltage that will be placed between anode 401 and cathode 402. In FIG. 4, n transistors 403-1, 403-2, up to 403-n are shown. n can be any number greater than or equal to 2. Each transistor 403 has at least a gate 403a, a source 403b and a drain 403c. Note that the bulk of transistor 403 is not shown. The bulk can be connected to any node within the scope of the invention. In one exemplary embodiment, the bulk may be connected to the anode 401. Alternatively, the bulk of each transistor may be connected to the source 403b of each transistor separately and respectively.

The ESD protection device 400 may further comprise a voltage divider circuit 405 coupled between the anode 401 and the cathode 402. The ESD protection device 400 may further comprise at least one inverting circuit 408. In FIG. 4, n inverting circuits 408 are shown, labeled 408-1, 408-2, . . . 408-n, respectively. Each inverting circuit 408 may have at least 4 connections: an input 408a, an output 408b, a lower voltage power node 408c, and a higher voltage power node 408d. The output 408b may be coupled to gate 403a of the corresponding transistor 403. For example, if n transistors 403 are used, 408b-1 may be coupled to 403a-1 and 408b-2 may be coupled to 403a-2, and up to the coupling of 408b-n to the gate 403a-n. The lower voltage power node 408c-x of inverting circuit 408-x may be coupled to the gate 403a-(x−1), wherein x may be any number from 2 to n. The lower voltage power node 408c-1 may be coupled to the cathode 402. For example, the lower voltage power node 408c-1 may be coupled to cathode 402, the lower voltage power node 408c-2 may be coupled to gate 403a-1, up to the coupling of the lower voltage power node 408c-n to the gate 403a-(n−1). Further note lower voltage power node 408c-x may also be coupled to output 408b-(x−1).

The ESD protection device 400 may further include a trigger circuit 404 having at least n trigger taps, 406-1 through 406-n, each coupled to the respective one of the inputs 408a-1 through 408a-n of the inverting circuit 408. For example, trigger tap 406-1 may be coupled to input 408a-1, trigger tap 406-2 may be coupled to input 408a-2, and up to the coupling of trigger tap 406-n to input 408a-n. The ESD protection device 400 may further comprise at least one voltage divider circuit 405 coupled between the anode 401 and the cathode 402. The voltage divider circuit 405 may have at least n voltage divider taps, 409-1 through 409-n, each coupled to the respective one of the higher voltage power nodes 408d-1 through 408d-n. For example, voltage divider tap 409-1 may be coupled to higher voltage power node 408d-1, voltage divider tap 409-2 may be coupled to higher voltage power node 408d-2, and up to the coupling of voltage divider tap 409-n to higher voltage power node 408d-n. It may also be possible to provide a coupling between trigger circuit 404 and voltage divider circuit 405 by means of the coupling 407. In FIG. 4, n couplings, 407-1 through 407-n, are shown, but any number of couplings could be implemented. Note also that though FIG. 4 depicts the voltage divider circuit 405 with n biasing voltages, 409-1 through 409-n, voltage divider circuit 405 may provide a different number of biasing voltages than n (the number of transistors 403).

During normal operation, the trigger circuit 404 may be configured to set each inverting driver 408 in a high output state. When an inverting driver 408-x is in a high output state, the voltage of the output of the inverter 408b-x may have a voltage level equal to or close to the voltage at the respective higher voltage power node 408d-x. The lower voltage power node 408c-x of inverting driver 408-x may be coupled to the output 408b-(x−1) of the inverting driver 408-(x−1). The higher voltage power node 408d-(x−1) of the inverter 408-(x−1) may be coupled to a biasing voltage of the voltage divider tap 409-(x−1) from the voltage divider circuit 405, wherein x may be any number from 2 to n. Hence, the inverting driver 408-x may receive a voltage level on its lower voltage power node 408c-x equal to or close to the biasing voltage of the voltage divider tap 409-(x−1), and may receive the biasing voltage of the voltage divider tap 409-x at its higher voltage power node 408d-x. The lower voltage power node 408c-1 of the first inverting driver 408-1 may be coupled to the cathode 402. The higher voltage power node 408d-n of the n-th inverting driver 408-n may be coupled to and may be provided power by the anode 401. The gates 403a-x may receive a voltage equal or close to biasing voltage 409-x. The voltages at the sources 403b-x may only maximally differ from the voltages at the gates 403a-x by the MOS threshold voltage Vth, unless the source is driver and/or biased to a defined voltage. Hence, all transistors may be biased within normal operation voltages and may be below the maximum voltage ratings of the transistors, since the voltage divider 405 may divide the overvoltage between anode 401 and cathode 402 in voltages within the maximum rating.

During a stress event between the anode 401 and the cathode 402, the trigger circuit 404 may send signals 406 to the input 408a of the inverting drivers 408. This may cause the drivers to switch to a low output state. In a low output state, the voltage of the output 408b-x of the inverter 408-x may be equal to or close to the voltage at the lower voltage power node 408c-x of the inverter 408-x, and may cause the shunting transistors 403-x to turn on.

By using inverters 408 instead of coupling the shunting transistors 403 directly to the trigger circuit 404, the speed of the overall ESD clamping system may increase. Also, resistance of the MOS stack in conducting state seen between the anode 401 and the cathode 402 may decrease because transistors 403 may now be biased to the highest voltage allowed by the maximum rating.

Although only three shunting devices and inverting drivers are shown in FIG. 4, one skilled in the art should recognize that the number of stacked devices can vary and can be as few as two devices or more than three devices. Also, one should recognize that the topology of each inverting circuit 408 can be different. For example, the circuitry comprising inverting circuit 408-1 may not be the same as the circuitry comprising inverting circuit 408-2. Also, the layout, type, and size of each transistor 403 can be different.

Although only one inverting driver 408-x is shown coupled between trigger tap 406-x and gate 403a-x, one skilled in the art should recognize that any number of inverting drivers can be placed in sequence. In this way, any odd number of inverters may be placed in sequence to produce an overall inverting output, or any even number of inverters may be placed in sequence to produce a non-inverting output.

Figure 5A:
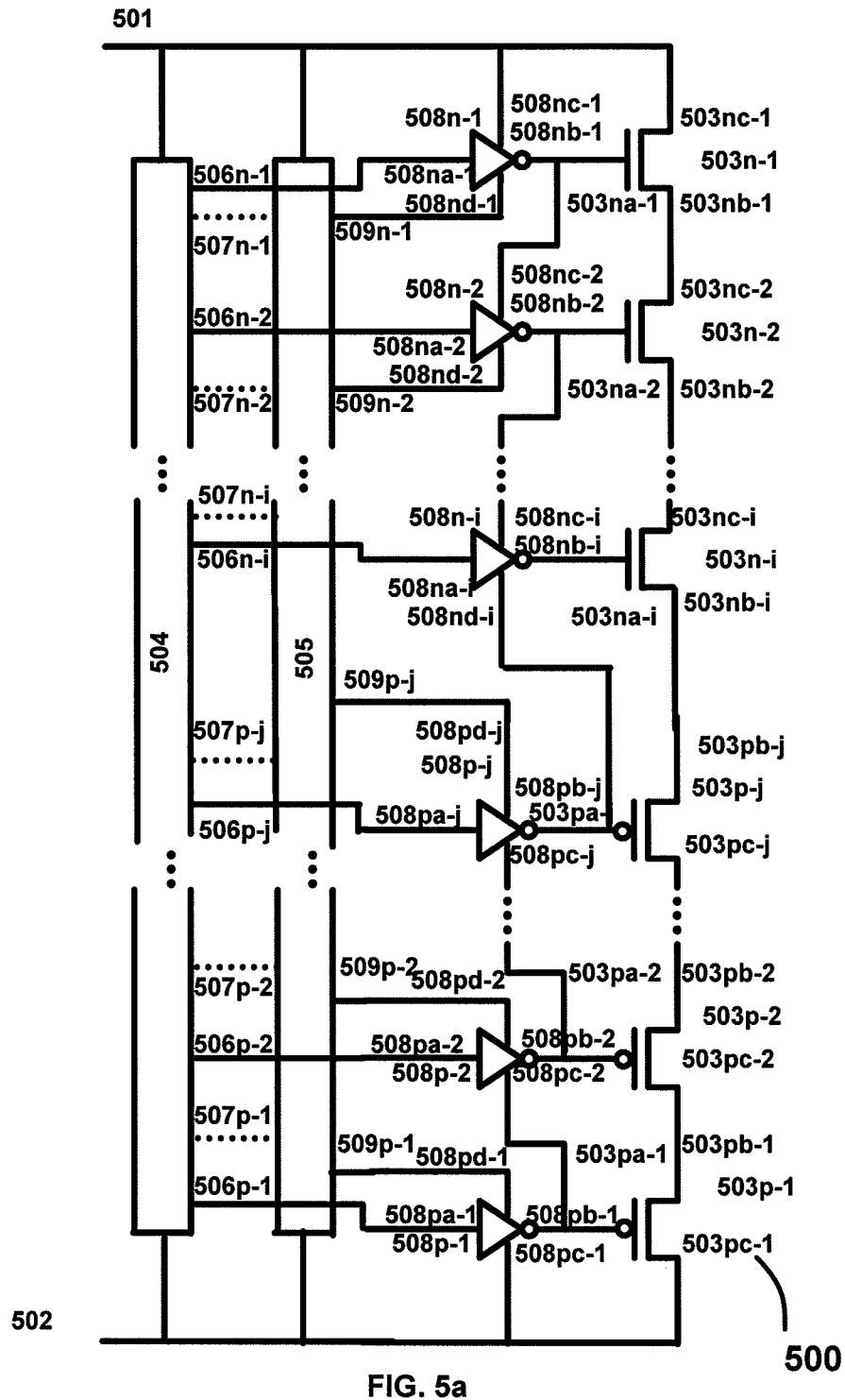
FIGS. 5a-5c are schematic diagrams of further embodiments of an ESD protection device.
Figure 5B:
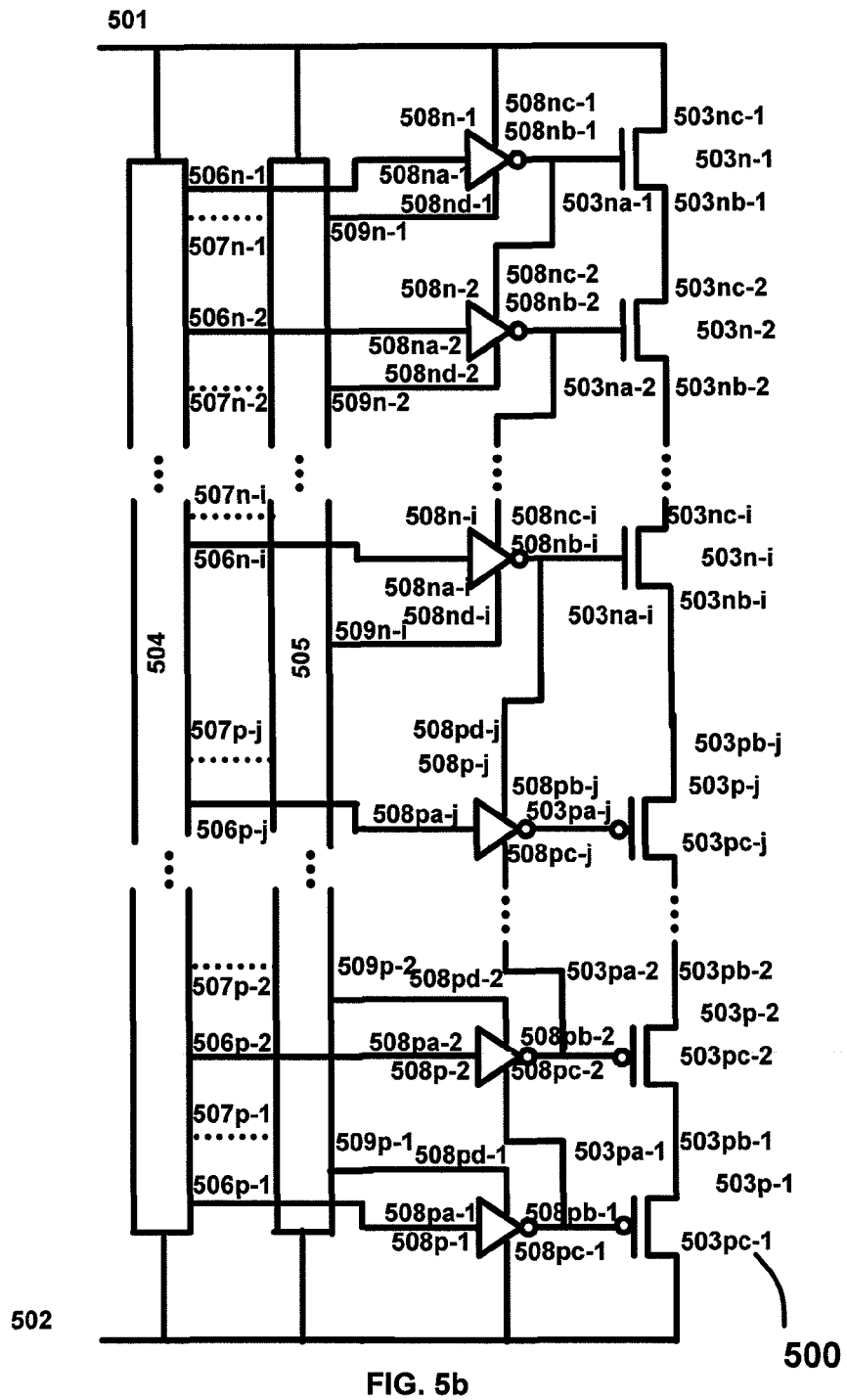
Figure 5C:
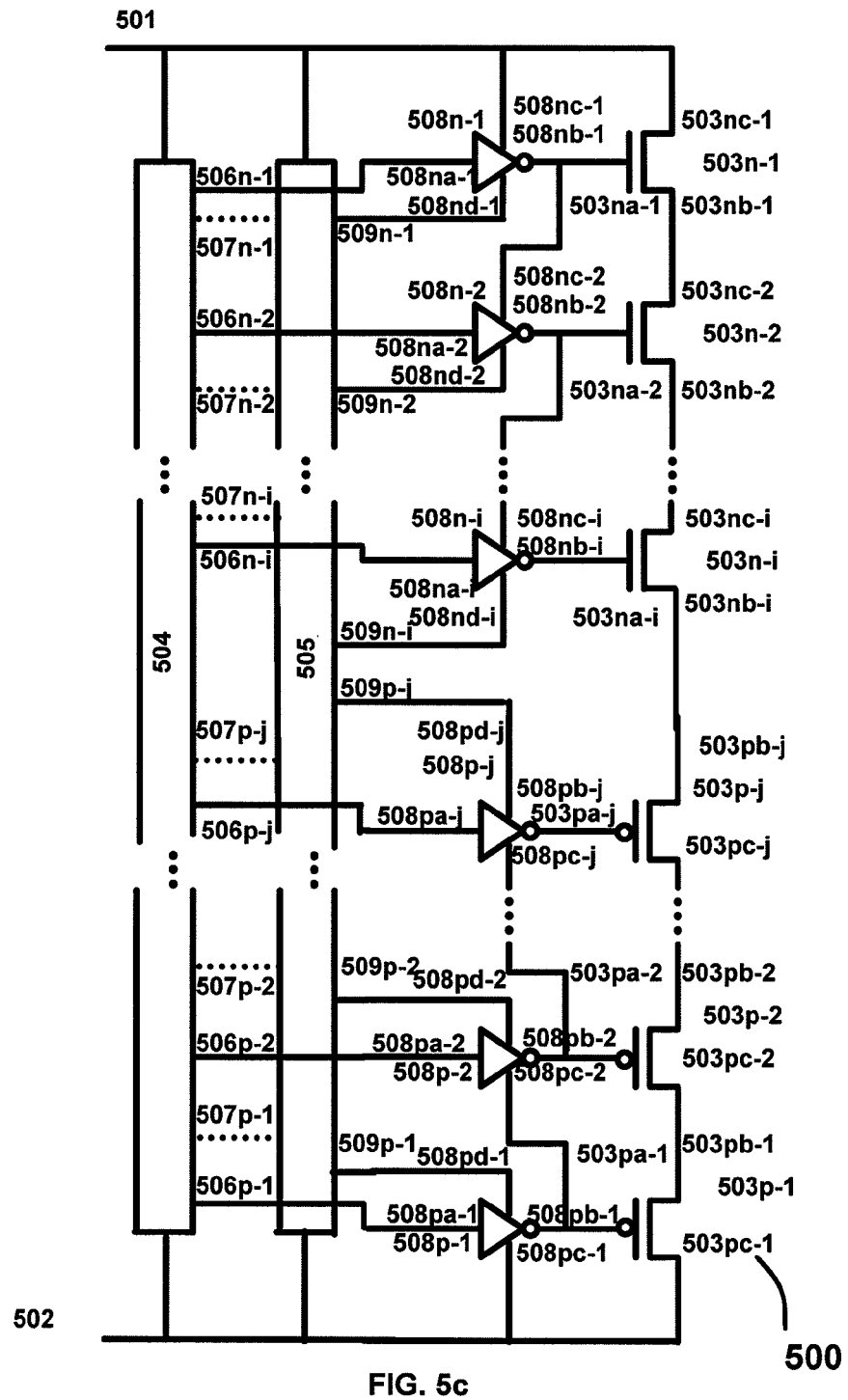

FIGS. 5a-5c each depict another embodiment of an ESD protection device 500. Although FIGS. 5a-5c each depict all the PMOS transistors 503p-1 through 503p-j and all the NMOS transistors 503n-1 through 503n-i coupled in separate groups, any combination of MOS transistors and order can be implemented. For example, the stack of MOS transistors 503 may be comprised of many groups of any size of alternating types of MOS transistors. Note that i may be equal to or different than j. i may be any integer greater than or equal to 1. j may be any integer greater than or equal to 1.

FIGS. 5a, 5b, and 5c each show an exemplary embodiment of an ESD protection device 500 including both PMOS transistors 503n and NMOS transistors 503p in the MOS stack. One should recognize that many other configurations of NMOS and PMOS transistors are possible than those depicted. Different configurations for the connection of the higher voltage power node of the inverting drivers coupled to the last PMOS or NMOS in the respective PMOS or NMOS stack are shown.

In FIG. 5a, lower voltage power node 508nd-i of inverting driver 508n-i is coupled to the gate 503pa-j of PMOS transistor 503p-j and the output 508pb-j of inverting driver 508p-j. Note that the lower voltage power nodes 508nd-x of the other inverting drivers 508n-x are coupled to respective voltage divider taps 509n-x, wherein x goes from 1 to i−1. The higher voltage power nodes 508pd-x of the inverting drivers 508p-x are coupled to respective voltage divider taps 509p-x, wherein x goes from 1 to j.

In FIG. 5b, higher voltage power node 508pd-j of inverting driver 508p-j is coupled to the gate 503na-i of NMOS transistor 503n-i and the output 508nb-i of inverting driver 508n-i. Note that the higher voltage power nodes 508pd-x of the other inverting drivers 508p-x are coupled to respective voltage divider taps 509p-x, wherein x goes from 1 to j−1. The lower voltage power nodes 508nd-x of the inverting drivers 508n-x are coupled to respective voltage divider taps 509n-x, wherein x goes from 1 to i.

In FIG. 5c, the lower voltage power nodes 508nd-x of the inverting drivers 508n-x are coupled to respective voltage divider taps 509n-x, wherein x goes from 1 to i. The higher voltage power nodes 508pd-x of the inverting drivers 508p-x are coupled to respective voltage divider taps 509p-x, wherein x goes from 1 to j. Voltage divider taps 509n-i and 509p-j may be the same node or may be different nodes.

Figure 6A:
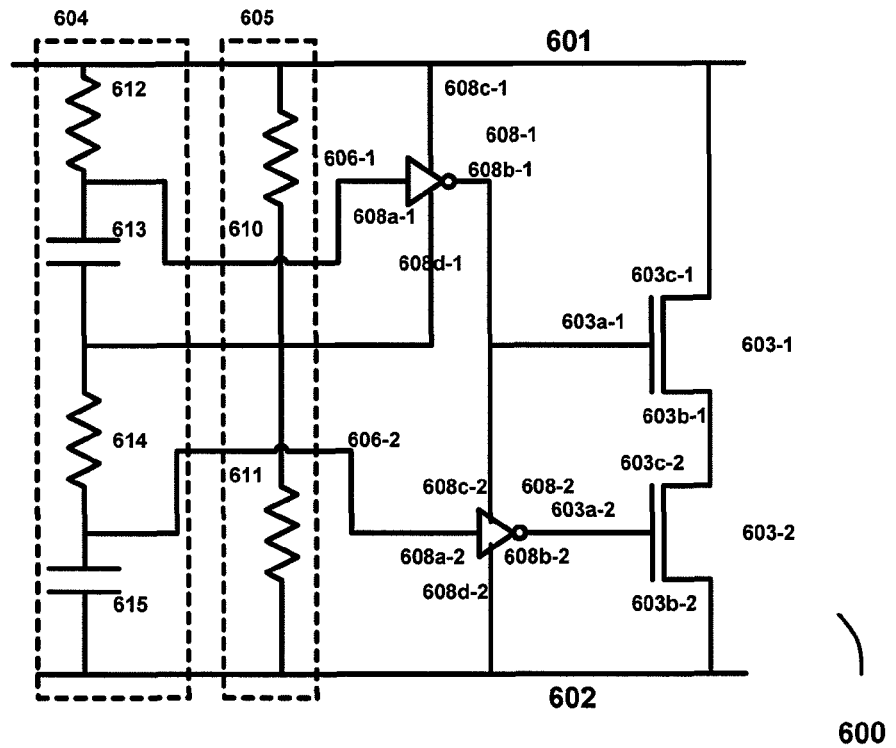
FIGS. 6a-6b are schematic diagrams of further embodiments of an ESD protection device.

FIG. 6a shows another exemplary embodiment of an ESD protection device including two stacked transistors 603-1 and 603-2. The voltage divider 605 may divide the overvoltage to levels within the maximum rating of the devices used. The trigger circuit 604 may comprise 2 RC circuits each having a capacitor 613/615 and a resistive element 612/614. As shown, the two RC-circuits may be coupled to the voltage divider to tap the divided bias voltage of the voltage divider tap 609-1 between resistors 610 and 611 and feed it during normal operation to the respective inputs of the inverting drivers 608-1 and 608-2 to which they are coupled. Thus, the inverting drivers 608-1 and 608-2 may only be exposed to a limited voltage. In turn, the upper inverting driver 608-1 may drive its output 608b-1 to a low state, thus providing a voltage level equal to or near the bias voltage level of voltage divider tap 609-1 to the gate 603a-1 of the upper shunting NMOS 603-1. The lower inverting driver 608-2 may drive its output 608b-2 to a low state, thus providing a voltage level equal to or near the voltage of cathode 602 to the gate 603a-2 of the lower shunting NMOS 603-2. As a result, lower shunting NMOS 6030-2 may turn off, which may cause the voltage at the drain 603c-2 of the NMOS 603-2 to be brought to approximately the bias voltage of the voltage divider tap 609-1.

During normal operation, the RC-circuits 612+613 and 614+615 may output a logic high value to the inputs of the inverting drivers 608-1 and 608-2, respectively. During an ESD event, the RC-circuits 612+613 and 614+615 may output a logic low value which may then cause the inverting drivers 608 to output a logic high value. The inverting drivers 608 driving the respective gates 603a of the NMOS transistors 603 high may cause the transistors 603 to conduct current.

Techniques known in the art to improve the trigger circuit can also be applied to any of the embodiments of the ESD protection device. These techniques may include extending the RC time contact by introducing feedback or increasing the turn off time. Feedback may be introduced by using a latch circuit which may include a series of inverters with a reference to the output fed back to the input of the series of inverters. Turn off time may be increased by forming an inverter such that it may switch faster in one direction than in the other direction. This may be done by making one of the NMOS/PMOS transistor in the inverter larger or smaller than the other transistor in the inverter.

In exemplary embodiments, the voltage divider circuit may comprise any combination of poly resistors, metal resistors, MOS transistors, diodes, etc. . . .

In exemplary embodiments, the trigger circuit may comprise any combination of resistors, capacitors (formed by MOS-capacitors, gate oxide-capacitors, poly-capacitors, or metal capacitors), diodes, MOS devices, and inverters.

Figure 6B:
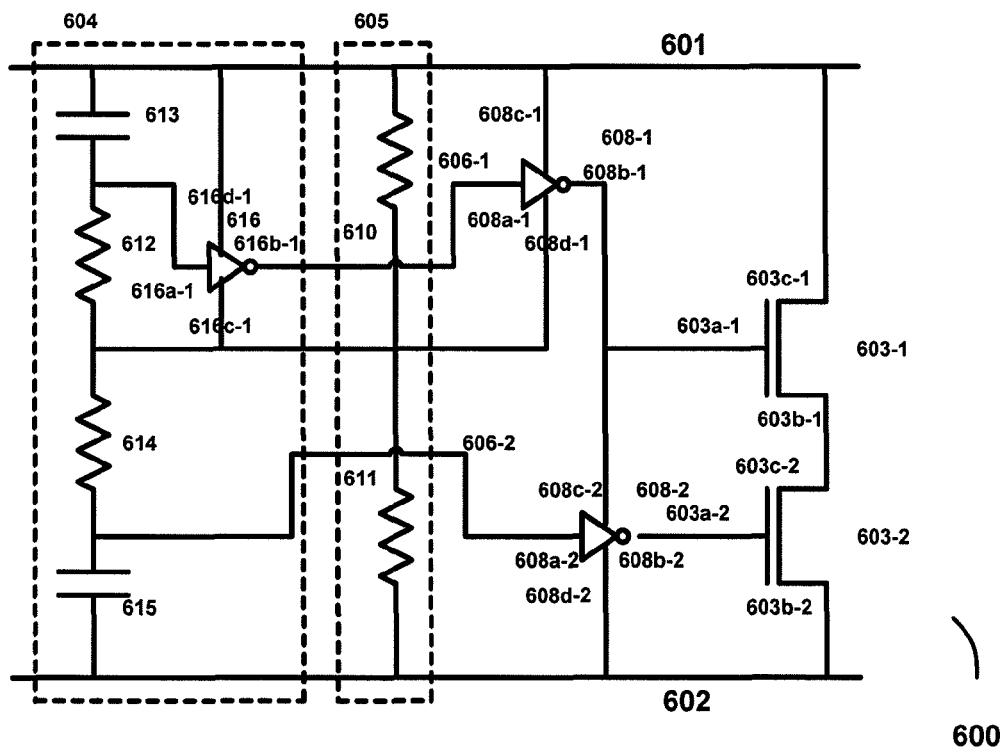

FIG. 6b depicts another exemplary embodiment of an ESD protection device with two stacked transistors 603-1 and 603-2. The voltage divider 605 may divide the overvoltage to levels within the maximum rating of the devices used. The ESD protection device of FIG. 6b is similar to the structure depicted in FIG. 6a, but the upper RC 612+613 may be connected in a different way. In FIG. 6b, an additional inverter 616-1 may be needed to deliver a logic high value to the inverting driver 608-1 during normal operation and a low logic value during ESD operation. Note that though only one inverter 616-1 and one inverter 608-1 are shown, additional inverters can also be implemented so that the final output of the serial inverters turns off the respective shunt MOS transistors 603 during normal operation and turn on the respective shunt MOS transistors 603 during an ESD event.

The ESD protection devices 300 through 600 shown in FIGS. 3 through 6, respectively, can be used as an ESD current sinking device or as a trigger device for an ESD current sinking device. For example, when used as a current sinking device, the MOS transistors 603-1 and 603-2 of FIG. 6a may shunt the ESD current from the anode 601 to the cathode 602. In another example, when used as a trigger device, MOS transistors 603-1 and 603-2 of FIG. 6a may trigger a current sinking device to shunt the ESD current from anode 601 to cathode 602. FIGS. 7a-7f show various exemplary embodiments of the ESD protection device 700 including an ESD current sinking device 717.

Figure 7A:
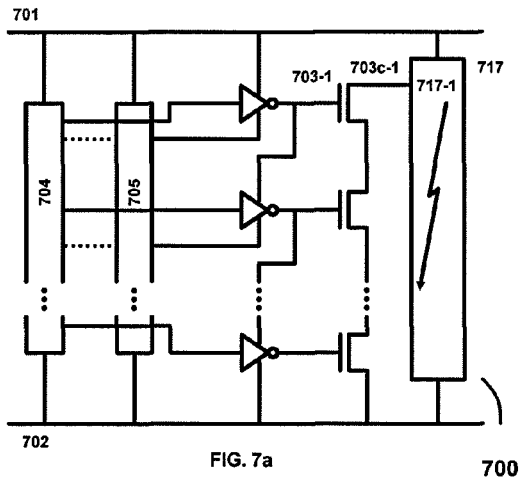
FIGS. 7a-7f are schematic diagrams of several embodiments of a trigger element.

FIG. 7a shows a first exemplary implementation of the ESD protection device used as a trigger circuit for the ESD current sinking device 717. The drain 703c-1 of transistor 703-1 may be connected to a trigger tap 717-1 of the ESD current sinking device 717. The anode of the ESD current sinking device 717 may be coupled to node 701. The cathode of the ESD current sinking device 717 may be coupled to node 702.

Figure 7B:
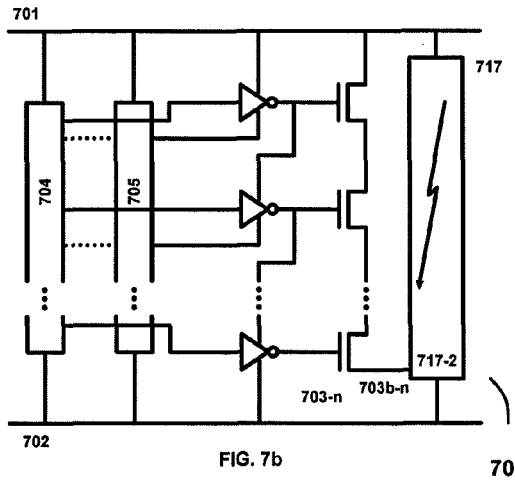

FIG. 7b shows a second exemplary implementation of the ESD protection device used as a trigger circuit for the ESD current sinking device 717. The source 703b-n of transistor 703-n may be connected to a trigger tap 717-2 of the ESD current sinking device 717. The anode of the ESD current sinking device 717 may be coupled to node 701. The cathode of the ESD current sinking device 717 may be coupled to node 702.

Figure 7C:
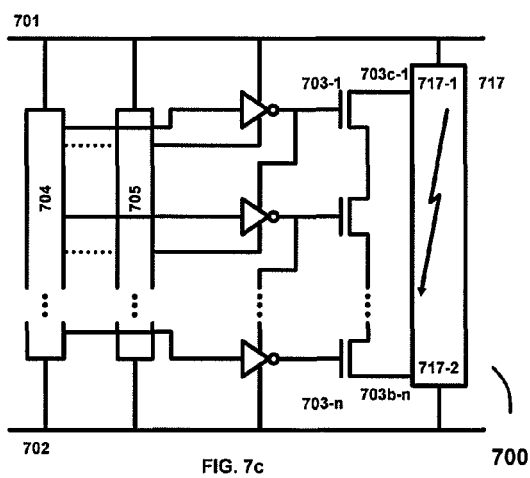

FIG. 7c shows a third exemplary implementation of the ESD protection device used as a trigger circuit for the ESD current sinking device 717. The drain 703c-1 of transistor 703-1 may be connected to a first trigger tap 717-1 of the ESD current sinking device 717 and the source 703b-n of transistor 703-n may be connected to a second trigger tap 717-2 of the ESD current sinking device 717. The anode of the ESD current sinking device 717 may be coupled to node 701. The cathode of the ESD current sinking device 717 may be coupled to node 702.

Figure 7D:
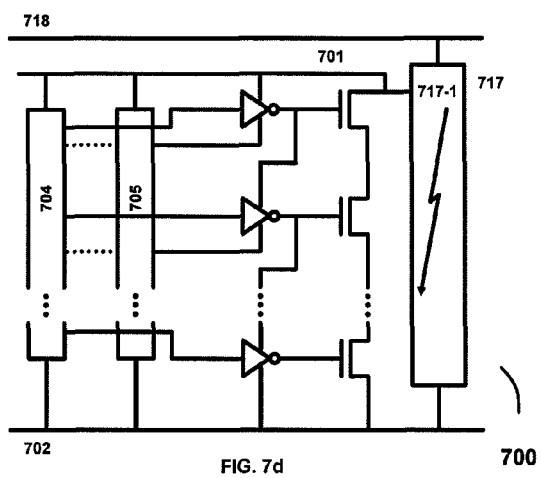

FIG. 7d shows a fourth exemplary implementation of the ESD protection device used as a trigger circuit for the ESD current sinking device 717. The anode 701 of the trigger circuit may be connected to a trigger tap 717-1 of the ESD current sinking device 717. The anode of the ESD current sinking device 717 may be coupled to a node 718. The cathode of the ESD current sinking device 717 may be coupled to node 702.

Figure 7E:
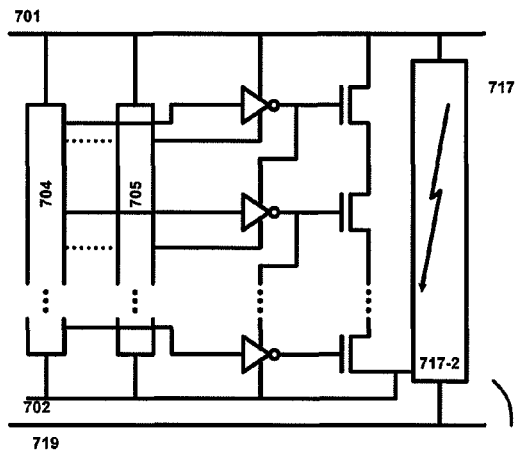

FIG. 7e shows a fifth exemplary implementation of the ESD protection device used as a trigger circuit for the ESD current sinking device 717. The cathode 702 of the trigger circuit may be connected to a trigger tap 717-2 of the ESD current sinking device 717. The anode of the ESD current sinking device 717 may be coupled to node 701. The cathode of the ESD current sinking device 717 may be coupled to node 719.

Figure 7F:
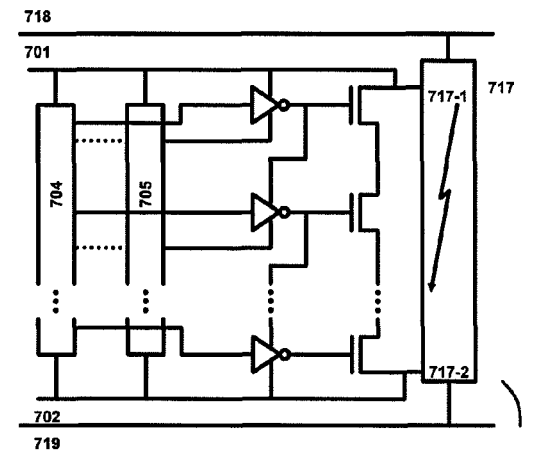

FIG. 7f shows a sixth exemplary implementation of the ESD protection device used as a trigger circuit for the ESD current sinking device 717. The anode 701 of the trigger circuit may be connected to a first trigger tap 717-1 of the ESD current sinking device 717. The cathode 702 of the trigger circuit may be connected to a second trigger tap 717-2 of the ESD current sinking device 717. The anode of the ESD current sinking device 717 may be coupled to node 718. The cathode of the ESD current sinking device 717 may be coupled to node 719.

Although the implementations shown in FIGS. 7a-7f demonstrate the use of the ESD protection device as trigger circuit, these implementations may also be used as a standalone clamp. Although only NMOS devices are depicted in FIGS. 7a-7f, PMOS or a combination of NMOS and PMOS may be used as similarly described for FIGS. 4, 5a, 5b, 5c, 6a, and 6b.

The current sinking device 717 of FIG. 7a-7f may comprise any combination of silicon controlled rectifiers (SCRs), MOS transistors, bipolar transistors, diodes, etc. . . .

Figure 8A:
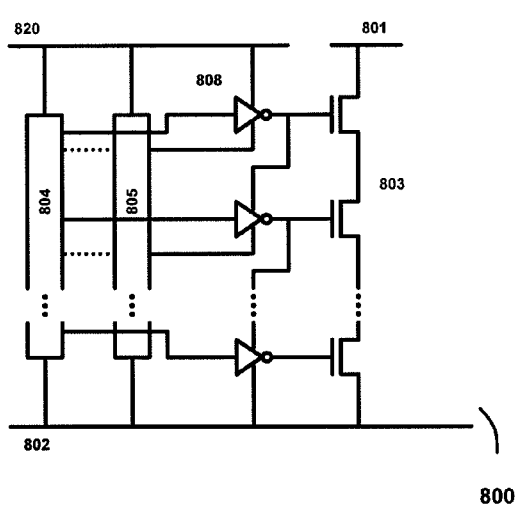
FIGS. 8a-8b are schematic diagrams of further embodiments of an ESD protection device.
Figure 8B:
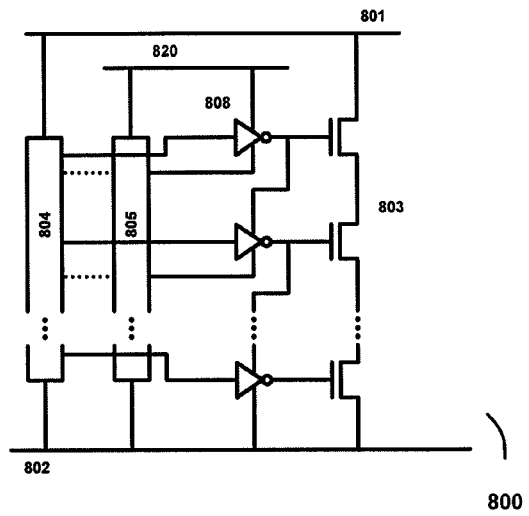

FIGS. 8a and 8b illustrate exemplary configurations of the trigger circuit 804, voltage divider circuit 805, inverting drivers 808 and the MOS transistors 803 coupled to different nodes. In FIG. 8a, the MOS transistors 803 may be coupled to a different circuit node 801 than the trigger circuit 804, voltage divider circuit 805, and inverting drivers 808 which may be coupled to node 820. One exemplary use for such a configuration could be when the voltage divider 805 is coupled to a power supply and the stack of transistors 803 are coupled to an input, output, or I/O pad. In FIG. 8b, trigger circuit 804 and the stack of transistors 803 may be coupled to one circuit node 801, and the voltage divider circuit 805 and the inverting drivers 808 may be coupled to a second circuit node 820. One skilled in the art should recognize that other combinations of connections are possible.

Although the exemplary implementations of an ESD protection circuit shown in FIGS. 8a and 8b depict the ESD protection device as a standalone device, these implementations may also be used as a trigger device as similarly shown, for example, in FIGS. 7a-7f, to trigger an ESD current sinking device.

Figure 9C:
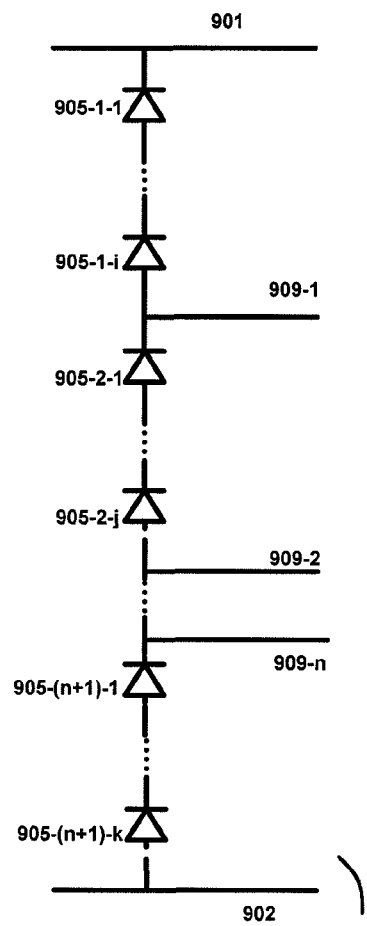
Figure 9D:
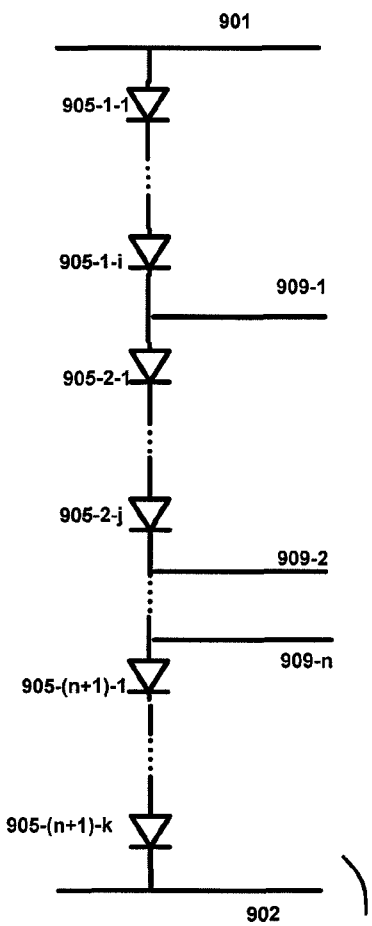

FIGS. 9a-9d show four exemplary implementations of a voltage divider circuit 905 which may be used as part of any of the disclosed embodiments of ESD protection devices. Resistors 905-1 to 905-(n+1) depicted in FIG. 9a may be used to divide the voltage between anode 901 and cathode 902 into n different bias voltages 909-1 to 909-n. In another embodiment, MOS devices may be used. In FIG. 9b, the voltage divider 905 may comprise (n+1) groups of MOS devices 905-1 to 905-(n+1). Each group may include i, j, or k PMOS devices. Note that i, j and k could have the same value or could be different values. Note that greater or fewer groups could be used. Note that instead of connecting the gate of a PMOS device to its drain as depicted, alternatively the gate could be connected to another circuit node. The bulk of each of the PMOS devices could be connected to the respective source or the bulks could be coupled together. Furthermore, NMOS devices could be used in place of PMOS devices. In yet another embodiment of a voltage divider, diodes may be used in a reverse-biased configuration, for example, as depicted in FIG. 9c. In another embodiment, the diodes 905 may be implemented as Zener diodes. In yet another exemplary embodiment, diodes may be used in a forward-biased configuration as depicted in FIG. 9d.

Figure 10A:
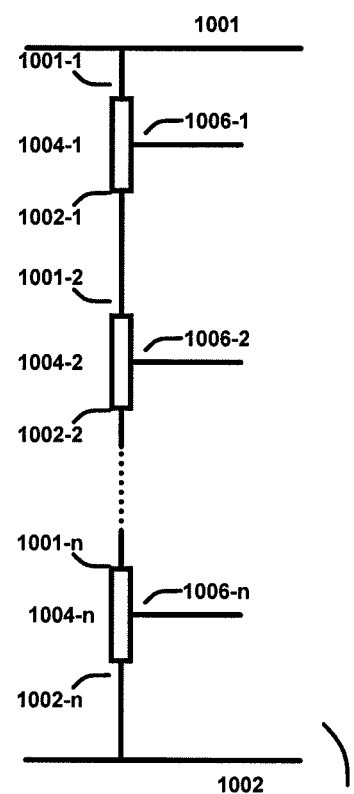

FIGS. 10a-10k show various exemplary implementations of a trigger circuit 1004 which may be used as part of any of the disclosed embodiments of ESD protection devices. FIG. 10a depicts a schematic overview of an implementation of the trigger circuit 1004. The trigger circuit may comprise n trigger sub blocks 1004-1 to 1004-n. Each trigger sub block 1004-i may have an anode 1001-i and a cathode 10024, wherein i may be a number from 1 to n.

Figure 10B:
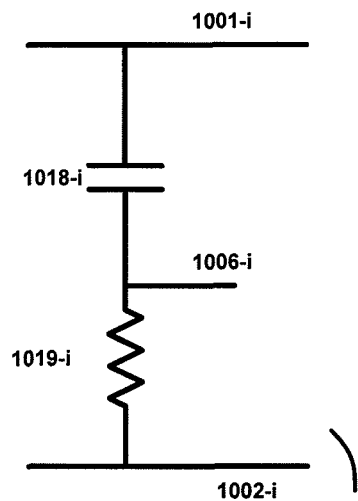
Figure 10C:
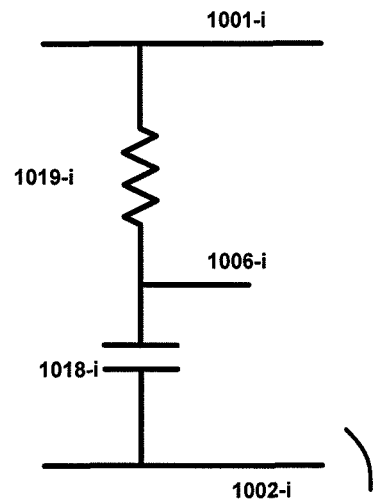
Figure 10D:
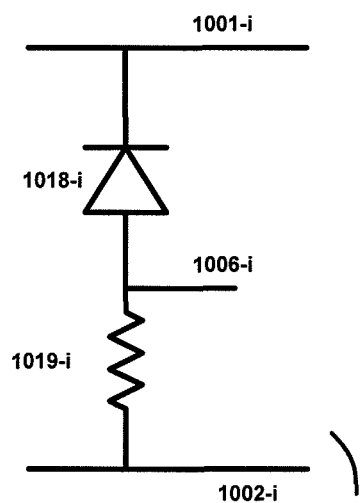
Figure 10E:
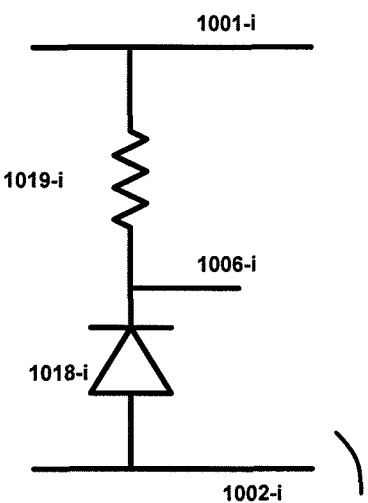
Figure 10F:
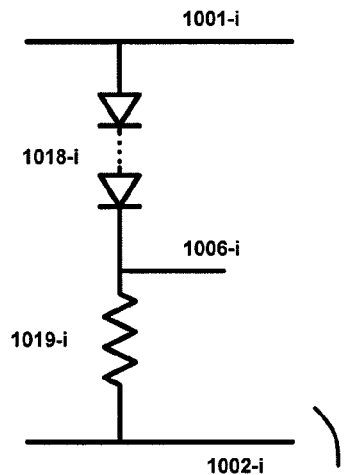
Figure 10G:
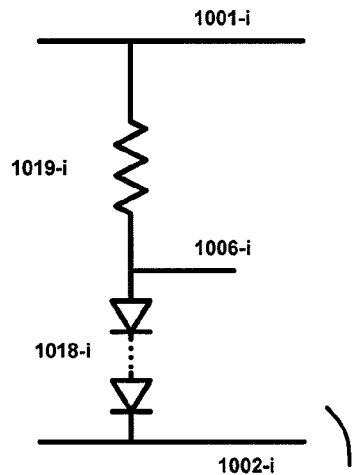
Figure 10H:
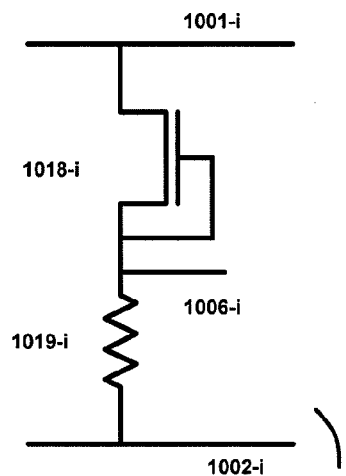
Figure 10I:
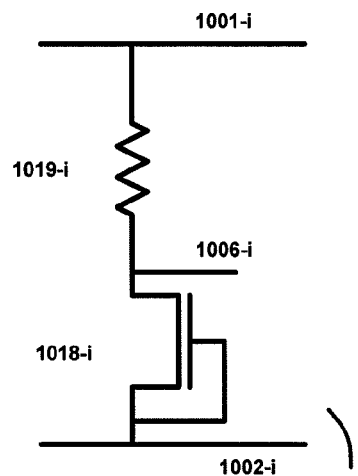

Some examples of the trigger sub block 1004-i are shown in FIGS. 10b to 10i. FIGS. 10b and 10c show different configurations of trigger sub block 1004-i using a transient detector comprising a resistor 1019-i and capacitor 1018-i. FIGS. 10d and 10e show different configurations of trigger sub block 1004-i using reverse-biased diodes 1018-i or Zener diodes 1018-i in combination with resistor 1019-i. FIGS. 10f and 10g show different configurations of trigger sub block 1004-i using a stack of diodes in a forward-biased direction 1018-i in combination with a resistor 1019-i. FIGS. 10h and 10i show different configurations of trigger sub block 1004-i using MOS devices 1018-i in combination with a resistor 1019-i to determine a trigger voltage at trigger tap 1006-i. FIGS. 10j and 10k show different configurations of trigger sub block 1004-i using a transient detector comprising a resistor 1019-i and capacitor 1018-i. Additional inverter 1020-i ma be added to reverse the output 1006-i from a low state to a high state and from a high state to a low state.

The disclosed embodiments of an ESD protection device could be implemented in all kinds of technologies such as complementary metal oxide semiconductor (CMOS), bipolar-CMOS (biCMOS), silicon-on-insulator (SOI), bipolar CMOS DMOS (BCD), high voltage (HV) technologies, etc.

Also other types of transistors may be used like bipolar transistors, native MOS, Power MOS, junction field effect transistor (JFET), insulated gate bipolar transistor (IGBT), etc.

The embodiments shown in the Figures and described above are exemplary and one skilled in the art should recognize that other combinations of the described embodiments implementing the principles disclosed are possible. Furthermore, one should recognize that embodiments comprising fewer or additional components than those described are possible.

The invention claimed is:

1. A circuit for use in an electrostatic discharge (ESD) protection device, the circuit comprising:
a first NMOS device including a first gate, a first source, and a first drain;
a second NMOS device including a second gate, a second source, and a second drain, wherein the first source is coupled to the second drain;
a first inverter including a first higher voltage power node, a first lower voltage power node, a first input, and a first output, wherein the first output is coupled to the first gate;
a second inverter including a second higher voltage power node, a second lower voltage power node, a second input, and a second output, wherein the second output is coupled to the second gate and wherein the second higher voltage power node is directly connected to the first output;
a voltage divider coupled to the first lower voltage power node; and
a trigger circuit coupled to the first input and the second input, wherein the trigger circuit is configured to sense an ESD event.

2. The circuit of claim 1, wherein the voltage divider includes at least a first voltage-limiting resistor serially connected to a second voltage-limiting resistor to form a biasing node between the first voltage-limiting resistor and the second voltage-limiting resistor, and wherein the first lower voltage power node is coupled to the biasing node.

3. The circuit of claim 2, wherein the trigger circuit includes at least a first trigger resistor serially connected to a first trigger capacitor, and wherein the first trigger resistor is coupled to the first input, and further wherein the first trigger capacitor is coupled between the first input and the first lower voltage power node.

4. The circuit of claim 2, wherein the trigger circuit includes:
a third inverter including a third input and a third output, wherein the third output is coupled to the first input;
at least a first trigger capacitor, wherein the first trigger capacitor is coupled to the third input; and
at least a first trigger resistor serially connected to the first trigger capacitor, wherein the first trigger resistor is coupled between the third input and the first lower voltage power node.

5. The circuit of claim 2, wherein:
the first higher voltage power node of the first inverter is coupled to the first drain of the first NMOS device;
the second lower voltage power node of the second inverter is coupled to the second source of the second NMOS device;
the trigger circuit is further coupled to the first drain of the first NMOS device, and the trigger circuit is further coupled to the second source of the second NMOS device; and
the voltage divider circuit is further coupled to the first drain of the first NMOS device, and the voltage divider is further coupled to the second source of the second NMOS device.

6. The circuit of claim 1, wherein the trigger circuit includes at least a first trigger resistor serially connected to a first trigger capacitor, and wherein the first trigger resistor is coupled to the first input, and further wherein the first trigger capacitor is coupled between the first input and the first lower voltage power node.

7. The circuit of claim 6, wherein:
the first higher voltage power node of the first inverter is coupled to the first drain of the first NMOS device;
the second lower voltage power node of the second inverter is coupled to the second source of the second NMOS device;
the trigger circuit is further coupled to the first drain of the first NMOS device, and the trigger circuit is further coupled to the second source of the second NMOS device; and
the voltage divider circuit is further coupled to the first drain of the first NMOS device, and the voltage divider is further coupled to the second source of the second NMOS device.

8. The circuit of claim 1, wherein the trigger circuit includes:
a third inverter including a third input and a third output, wherein the third output is coupled to the first input;
at least a first trigger capacitor, wherein the first trigger capacitor is coupled to the third input; and
at least a first trigger resistor serially connected to the first trigger capacitor, wherein the first trigger resistor is coupled between the third input and the first lower voltage power node.

9. The circuit of claim 8, wherein:
the first higher voltage power node of the first inverter is coupled to the first drain of the first NMOS device;
the second lower voltage power node of the second inverter is coupled to the second source of the second NMOS device;
the trigger circuit is further coupled to the first drain of the first NMOS device, and the trigger circuit is further coupled to the second source of the second NMOS device; and
the voltage divider circuit is further coupled to the first drain of the first NMOS device, and the voltage divider is further coupled to the second source of the second NMOS device.

10. The circuit of claim 1, wherein the first higher voltage power node of the first inverter is coupled to the voltage divider, and the second lower voltage power node of the second inverter is coupled to the voltage divider.

11. The circuit of claim 10, wherein the first higher voltage power node of the first inverter is coupled to the trigger circuit, and the second lower voltage power node of the second inverter is coupled to the trigger circuit.

12. The circuit of claim 11, wherein the first higher voltage power node of the first inverter is coupled to the first drain of the first NMOS device, and the second lower voltage power node of the second inverter is coupled to the second source of the second NMOS device.

13. A circuit for use in an electrostatic discharge (ESD) protection device, the circuit comprising:
a first PMOS device including a first gate, a first source, and a first drain;

a second PMOS device including a second gate, a second source, and a second drain, wherein the first source is coupled to the second drain;

a first inverter including a first higher voltage power node, a first lower voltage power node, a first input, and a first output, wherein the first output is coupled to the first gate;

a second inverter including a second higher voltage power node, a second lower voltage power node, a second input, and a second output, wherein the second output is coupled to the second gate and wherein the second lower voltage power node is directly connected to the first output;

a voltage divider coupled to the first higher voltage power node; and a trigger circuit coupled to the first input and the second input, wherein the trigger circuit is configured to sense an ESD event.

14. The circuit of claim 13, wherein the voltage divider includes at least a first voltage-limiting resistor serially connected to a second voltage-limiting resistor to form a biasing node between the first voltage-limiting resistor and the second voltage-limiting resistor, and wherein the first higher voltage power node is coupled to the biasing node.

15. The circuit of claim 14, wherein the trigger circuit includes at least a first trigger resistor serially connected to a first trigger capacitor, and wherein the first trigger capacitor is coupled to the first input, and further wherein the first trigger resistor is coupled between the first input and the first higher voltage power node.

16. The circuit of claim 14, wherein the trigger circuit includes:
a third inverter including a third input and a third output, wherein the third output is coupled to the first input;
at least a first trigger resistor, wherein the first trigger resistor is coupled to the third input; and
at least a first trigger capacitor serially connected to the first trigger resistor, wherein the first trigger capacitor is coupled between the third input and the first higher voltage power node.

17. The circuit of claim 14, wherein:
the first lower voltage power node of the first inverter is coupled to the first drain of the first PMOS device;
the second higher voltage power node of the second inverter is coupled to the second source of the second PMOS device;
the trigger circuit is further coupled to the first drain of the first PMOS device, and the trigger circuit is further coupled to the second source of the second PMOS device; and
the voltage divider circuit is further coupled to the first drain of the first PMOS device, and the voltage divider is further coupled to the second source of the second PMOS device.

18. The circuit of claim 13, wherein the trigger circuit includes at least a first trigger resistor serially connected to a first trigger capacitor, and wherein the first trigger capacitor is coupled to the first input, and further wherein the first trigger resistor is coupled between the first input and the first higher voltage power node.

19. The circuit of claim 13, wherein the trigger circuit includes:
a third inverter including a third input and a third output, wherein the third output is coupled to the first input;
at least a first trigger resistor, wherein the first trigger resistor is coupled to the third input; and
at least a first trigger capacitor serially connected to the first trigger resistor, wherein the first trigger capacitor is coupled between the third input and the first higher voltage power node.

20. The circuit of claim 19, wherein:
the first lower voltage power node of the first inverter is coupled to the first drain of the first PMOS device;
the second higher voltage power node of the second inverter is coupled to the second source of the second PMOS device;
the trigger circuit is further coupled to the first drain of the first PMOS device, and the trigger circuit is further coupled to the second source of the second PMOS device; and
the voltage divider circuit is further coupled to the first drain of the first PMOS device, and the voltage divider is further coupled to the second source of the second PMOS device.

21. The circuit of claim 13, wherein the first lower voltage power node of the first inverter is coupled to the voltage divider, and the second higher voltage power node of the second inverter is coupled to the voltage divider.

22. The circuit of claim 21, wherein the first lower voltage power node of the first inverter is coupled to the trigger circuit, and the second higher voltage power node of the second inverter is coupled to the trigger circuit.

23. The circuit of claim 22, wherein the first lower voltage power node of the first inverter is coupled to the first drain of the first PMOS device, and the second higher voltage power node of the second inverter is coupled to the second source of the second PMOS device.

* * * * *